United States Patent [19]

Berger

[11] Patent Number: 5,569,997
[45] Date of Patent: Oct. 29, 1996

[54] POWER SUPPLY FOR VOLATILE MEMORY DEVICES AND PORTABLE ELECTRICAL APPLIANCE IN VEHICLES

[75] Inventor: Alvin H. Berger, Brownstown, Mich.

[73] Assignee: Ford Motor Company, Dearborn, Mich.

[21] Appl. No.: 131,341

[22] Filed: Oct. 4, 1993

[51] Int. Cl.$^6$ .................................................. H01M 10/46
[52] U.S. Cl. ................................ 320/15; 320/56; 307/66
[58] Field of Search ...................................... 320/2, 15, 56,
320/30, 6; 307/10.7, 18, 22, 26, 44, 46, 66

[56] References Cited

U.S. PATENT DOCUMENTS

| | | | |
|---|---|---|---|
| 3,806,790 | 4/1974 | Marshall | 320/15 |
| 4,004,208 | 1/1977 | Tamminen | 320/2 |
| 4,207,511 | 6/1980 | Radtke | 320/6 |
| 4,547,629 | 10/1985 | Corless | 179/81 R |
| 4,704,542 | 11/1987 | Hwang | 320/13 X |
| 4,925,750 | 5/1990 | Theiss | 429/116 |
| 4,983,473 | 1/1991 | Smith | 429/48 |
| 5,010,454 | 4/1991 | Hopper | 362/61 |
| 5,077,643 | 12/1991 | Leach | 362/183 |
| 5,169,735 | 12/1992 | Witehira | 429/160 |
| 5,191,529 | 3/1993 | Ramsey et al. | 320/6 X |

FOREIGN PATENT DOCUMENTS

| | | |
|---|---|---|
| 0426109A2 | 5/1991 | European Pat. Off. . |
| 0574743A2 | 6/1992 | European Pat. Off. . |

OTHER PUBLICATIONS

Electronique Applications, No. 52, Mar. 1987, Paris, p. 49.
Dashlite Flashlight, Sold by LHI USA, Santa Fe Springs, California, Oct. 3, 1993.

*Primary Examiner*—Edward H. Tso
*Attorney, Agent, or Firm*—Mark Mollon

[57] ABSTRACT

A nonswitched power circuit energizes volatile memories of electronic devices in an automobile. When the main vehicle battery is present and providing power, the volatile memories are energized by the main battery through a diode. The main battery also maintains a rechargeable battery in a charged state. When the main battery voltage drops due to a discharged or disconnected main battery, the rechargeable battery maintains power to the volatile memories. The rechargeable battery may be included as part of a flashlight for providing a portable, rechargeable light source.

19 Claims, 2 Drawing Sheets

POWER SUPPLY FOR VOLATILE MEMORY DEVICES AND PORTABLE ELECTRICAL APPLIANCE IN VEHICLES

BACKGROUND OF THE INVENTION

The present invention relates in general to providing electrical power for volatile memories in electrical equipment used in transportation vehicles, and more specifically to a backup rechargeable battery for providing power to volatile memories during failure of a primary power source.

Many types of electrical equipment in automobiles, such as an engine control computer, an audio system, and a clock, take advantage of volatile electronic (semiconductor) memory for storing information used by the equipment. A volatile memory retains information only as long as energizing power is applied, but has advantages of low cost, small size, and the ability to have the memory contents rewritten numerous times. Non-volatile, rewriteable memory that maintains its memory contents without continuous application of power is available and is often used for critical information storage, but suffers from the disadvantages of greater expense and larger size. Thus, to minimize cost, noncritical information is typically kept in volatile memory in many types of electrical equipment. For example, a automotive audio system typically employs volatile memory for storing radio station resets, last volume setting, last station tuned, and other radio and audio control information in volatile memories. Automotive clocks having digital displays typically use volatile memory exclusively whether the clock is contained as part of the audio system or is a separate unit contained on a vehicle dashboard. An electronic engine control (EEC) computer employs volatile memory for various adaptive engine parameters for optimizing performance such as idle airflow.

In prior art automotive electrical systems, the electrical equipment including the volatile memories receives electrical power from a main vehicle battery. A failure of the vehicle battery due to its discharge or removal results in the loss of information from volatile memories powered by the vehicle battery. Therefore, each occurrence of a dead battery or replacement of a battery necessitates reprogramming of volatile memories to restore the lost information. For example, an automobile user must manually reset a clock and manually re-enter the desired radio station presets after failure of the main battery. With regard to lost memory contents in the EEC, engine operation can be established using base values with subsequent redetermination of lost parameter values; however, engine performance and emissions may suffer during the interim time period.

A further problem resulting from main battery failure is the inability to operate even low power electrical appliances in the vehicle. For example, illumination by a courtesy dome light is unavailable while the battery is dead.

SUMMARY OF THE INVENTION

The present invention provides the advantages that memory contents of volatile memory are retained during main battery failure, and operation of selected low power electrical appliances is maintained during battery failure.

The foregoing problems are solved by an electrical power circuit for volatile electronic memory of electrical equipment in a vehicle having a primary power source. The power circuit comprises a power branch line coupled to the volatile memory and coupled to the primary power source. A rechargeable battery is coupled to the power branch line to maintain power to the volatile memory in the absence of power from the primary power source and is coupled to the primary power source for recharging the rechargeable battery in the presence of power from the primary power source. The rechargeable battery may further be connected to a low power electrical appliance for operation during failure of the primary power source. The electrical appliance is powered by the rechargeable battery and may be portable and have a housing for containing the rechargeable battery.

DETAILED DESCRIPTION OF PREFERRED EMBODIMENTS

Figure 1:
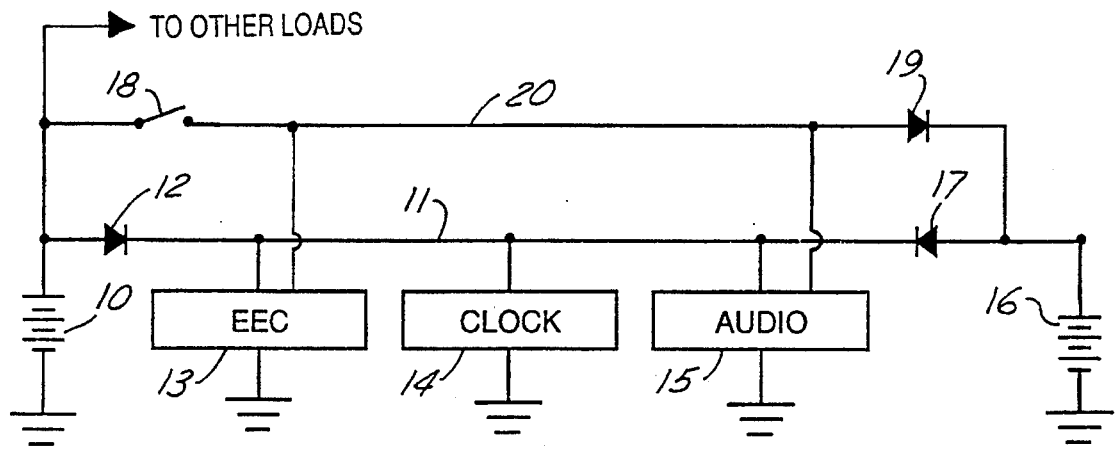
FIG. 1 is a schematic diagram of the present invention.

FIG. 1 shows a preferred embodiment of the invention including a main vehicle battery 10 for supplying DC electrical power to a power branch line 11 through a diode 12. Power branch line 11 is a separate power line for supplying power to energize volatile memory circuits in a plurality of electronic devices such as an EEC 13, clock 14, and audio system 15. Power branch line 11 also is connected to receive power from a rechargeable battery 16 through a diode 17.

An ignition switch 18 is connected to battery 10 for providing power to an ignition line 20 when ignition switch 18 is closed. Ignition line 20 is coupled to electronic devices such as EEC 13 and audio system 15 for supplying main power to the high power components of those devices. A diode 19 is coupled between ignition line 20 and rechargeable battery 16 for recharging rechargeable battery 16 when ignition switch 18 is closed. Battery 10 is connected to other loads either directly or through ignition switch 18 as is known in the art.

The power circuit of FIG. 1 has two main operating conditions. First, main battery 10 is present and supplying electrical power (main battery 10 represents a primary power source that also includes an alternator and voltage regulator as commonly employed in vehicle electrical systems). In the presence of power from this primary power source, volatile memories connected to power branch line 11 receive energization through diode 12 from main battery 10. Preferably, rechargeable battery 16 generates a voltage lower than the voltage from main battery 10 so that power is supplied to the volatile memories only from main battery 10 (diode 17 is reversed biased by the higher voltage from main battery 10). When ignition switch 18 is closed, power is supplied from ignition line 20 to electrical devices such as EEC 13 and audio system 15, thereby avoiding the power drop occurring in diode 12. In addition, diode 19 becomes forward biased whereby rechargeable battery 16 can be recharged through ignition switch 18 and diode 19. Diode 17 prevents recharging of rechargeable battery 16 when ignition switch 18 is opened.

In the absence of power from the primary power source of main battery 10, power supplied to the volatile memories is assumed by rechargeable battery 16. Volatile memory circuits typically require a five-volt power supply. Rechargeable battery 16 provides a voltage greater than the power supply requirements of the volatile memories and less than the voltage from main battery 10. Thus, rechargeable battery 16 has a voltage typically between 12 and 5 volts, preferably about 8 volts. Diode 12 prevents power from rechargeable battery 16 from flowing to other loads in the absence of power from main battery 10 when ignition switch 18 is open. In addition, diode 19 prevents power flow from rechargeable battery 16 to other loads when ignition switch 18 is closed.

Figure 2:
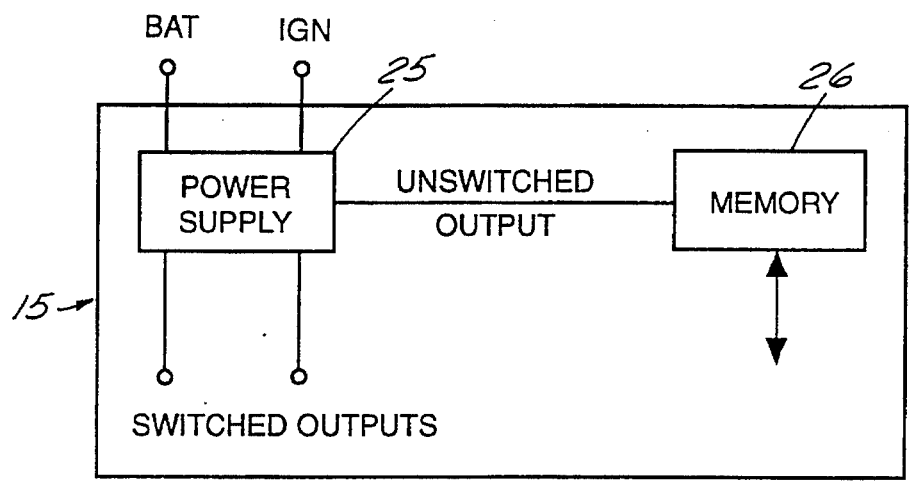
FIG. 2 is a block diagram showing portions of an audio system in greater detail.

Referring to FIG. 2, audio system 15 is shown in greater detail. A power supply 25 receives unswitched battery power BAT from power branch line 11 and switched battery power IGN from ignition line 20. Power supply 25 provides an unswitched output of about 5 volts to a volatile memory 26. Memory contents of memory 26 are utilized and modified by other elements of audio system 15 such as a microprocessor (not shown). Power supply 25 also comprises switched outputs which provide predetermined voltages only in response to power via ignition 20. The switched outputs provide power to higher power circuits such as a cassette drive, radio tuner, and audio processing and amplifier circuits.

Figure 3:
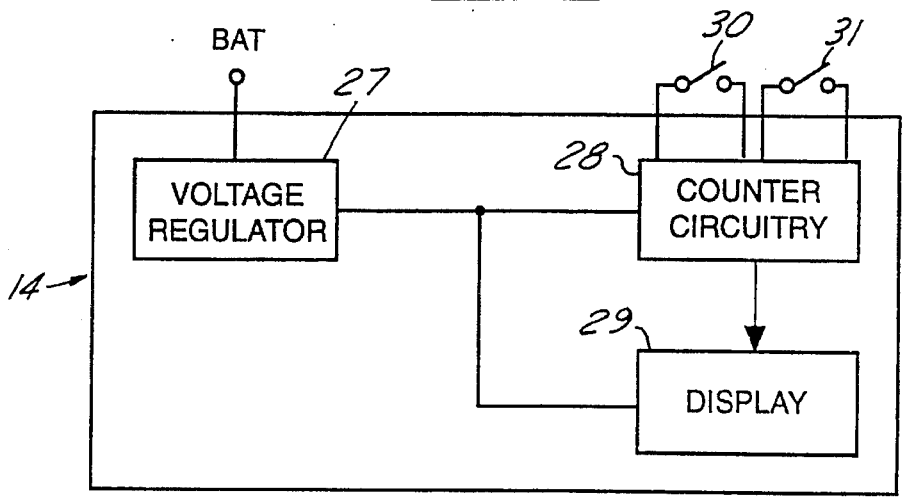
FIG. 3 is a block diagram showing portions of a clock in greater detail.

Referring to FIG. 3, clock 14 is shown in greater detail including a voltage regulator 27 receiving unswitched battery power BAT from power branch line 11. Voltage regulator 27 supplies power to counter circuitry 28 and a digital display 29 as is known in the art. A pair of reset switches 30 and 31 are provided for resetting the memory contents of counter circuitry 28 to adjust the time shown on display 29 as is known in the art. Clock 14 is an example of an electrical appliance for which continuous operation is desired at all times (even when the ignition switch is off and even in the absence of power from the main battery). However, clock 14 may also include switched power (not shown) to eliminate or reduce power to display 29 when the ignition switch is off, thereby limiting power drain from the battery.

Figure 4:
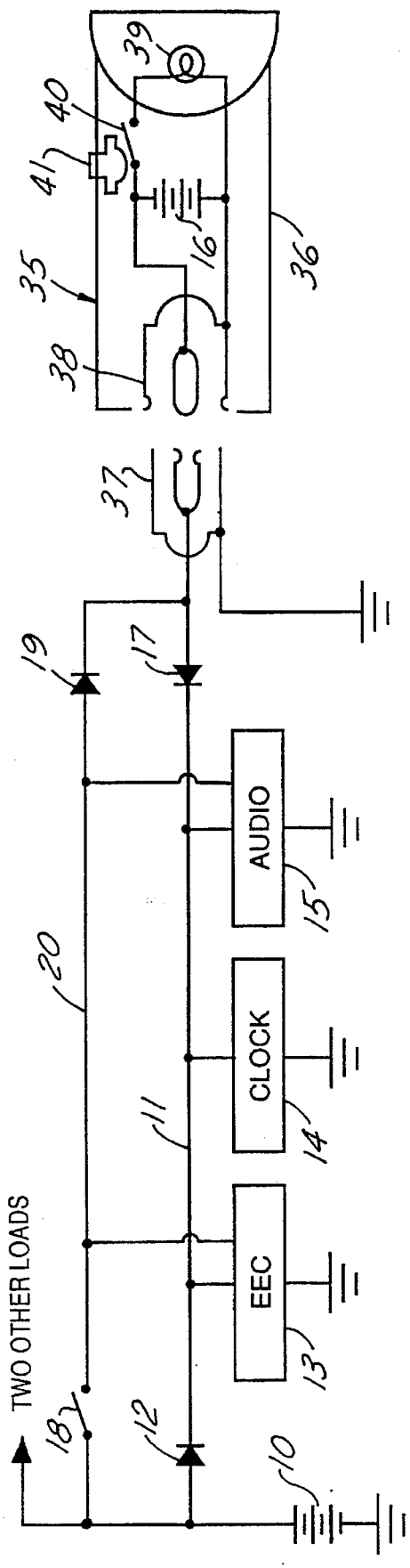
FIG. 4 is a schematic, block diagram of the power circuit of the present invention including a portable flashlight.

A further low power appliance which would desirably be available even in the absence of main battery power is a light source, such as a dome light. In an alternative embodiment of the invention shown in FIG. 4, illumination may be provided by a rechargeable flashlight 35. A flashlight housing 36 includes rechargeable battery 16 which is interconnected with the power circuit of FIG. 1 via a connector having a receptacle portion 37 and a plug portion 38. Connected in series across rechargeable battery 16 are an incandescent bulb 39 and a flashlight switch 40. Switch 40 is normally opened but can be closed by actuation of a slide 41. Receptacle 37 and plug 38 are polarized to ensure proper connection to rechargeable battery 16.

Figure 5:
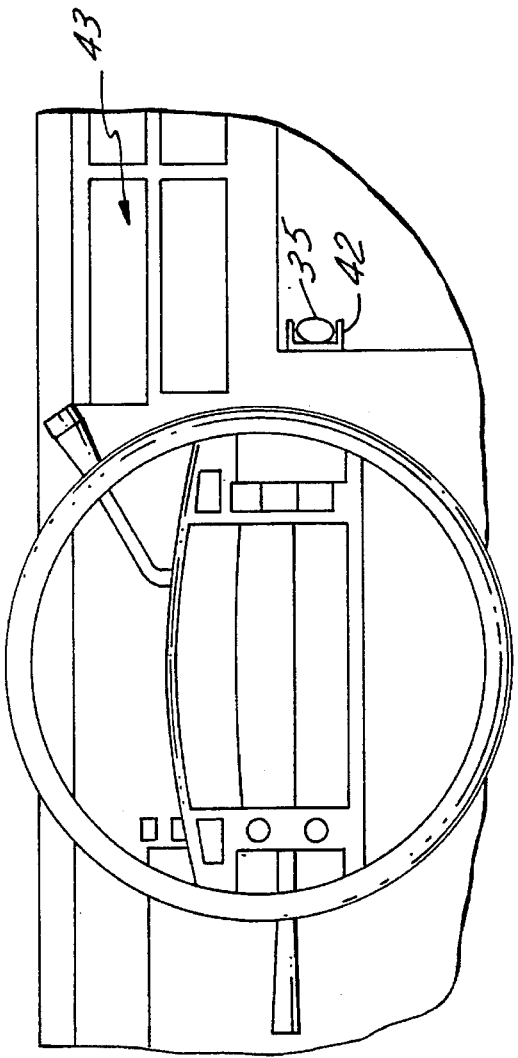
FIG. 5 is a diagrammatic view of an installation for receiving the portable, rechargeable flashlight of FIG. 4.

As shown in FIG. 5, rechargeable flashlight 35 is preferably retained in a holster 42. Flashlight 35 slides into holster 42 such that receptacle 37 and plug 38 are engaged. A latch or spring-loaded detent (not shown) are used to hold flashlight 35 in holster 42. Holster 42 is located under an instrument panel 43 on the passenger side of an automotive vehicle. This preferred location can be reached by either the driver or the front seat passenger and does not interfere with the driver's access to other controls. Furthermore, it is unlikely to be knocked loose from its holster.

In summary, the foregoing invention maintains volatile memory contents in electronic memory of electrical equipment in a vehicle having a primary power source. When the primary power source is available, then the volatile memory is energized substantially continuously from the primary power source and the rechargeable auxiliary power source (i.e. rechargeable battery) is recharged from the primary power source. When the primary power source is not available, then the volatile memory is energized from the rechargeable auxiliary power source. Furthermore, when the primary power source is not available, electrical power is prevented from flowing from the rechargeable auxiliary power source to electrical equipment other than the volatile memory.

What is claimed is:

1. An electrical power circuit for volatile electronic memory of electrical equipment in a vehicle, said vehicle having a primary power source, said electrical power circuit comprising:

an ignition branch line coupled to said primary power source through an ignition switch and coupled to said electrical equipment, including portions of said electrical equipment other than said volatile electronic memory;

a power branch line coupled to said volatile memory and coupled to said primary power source to continuously provide power to said volatile memory from said primary power source independently of said ignition switch;

a rechargeable battery coupled to said power branch line to maintain power to said volatile memory in the absence of power from said primary power source and coupled to said primary power source for recharging said rechargeable battery in the presence of power from said primary power source; and isolation means coupled to said ignition branch and to said rechargeable battery to prevent transfer of electrical power from said rechargeable battery to said ignition branch.

2. The power circuit of claim 1 further comprising a low power electrical appliance coupled to said power branch line having a voltage requirement lower than the voltage of said rechargeable battery.

3. The circuit of claim 1 wherein said rechargeable battery is removable.

4. The circuit of claim 3 further comprising a portable electrical appliance for containing and being powered by said rechargeable battery.

5. The circuit of claim 4 wherein said portable electrical appliance comprises a flashlight.

6. The circuit of claim 1 wherein said primary power source includes a main vehicle battery.

7. The circuit of claim 1 wherein said electrical equipment containing said volatile memory comprises an audio system.

8. The circuit of claim 1 wherein said electrical equipment containing said volatile memory comprises an electronic engine control.

9. The circuit of claim 1 wherein said electrical equipment containing said volatile memory comprises an electronic clock.

10. The circuit of claim 1 wherein the voltage provided by said rechargeable battery is intermediate the voltage provided by said primary power source and the operating voltage of said volatile electronic memory.

11. A method for maintaining volatile memory contents in electronic memory of electrical equipment in a vehicle having a primary power source and a rechargeable auxiliary power source, said vehicle including an ignition switch connected to said primary power source, said method comprising the steps of:

when said primary power source is available, then:
energizing said volatile memory substantially continuously from said primary power source independently of said ignition switch;
energizing portions of said electronic equipment other than said volatile memory from said primary power source through said ignition switch; and
recharging said rechargeable auxiliary power source from said primary power source through said ignition switch; and when said primary power source is not available, then:
energizing said volatile memory from said rechargeable auxiliary power source;
preventing energization of said portions of said electronic equipment other than said volatile memory by said rechargeable auxiliary power source; and
preventing energization of said primary power source by said rechargeable auxiliary power source.

12. The method of claim 11 further comprising the step of:
incorporating said rechargeable auxiliary power source in a removable electrical appliance.

13. A vehicle electrical system comprising:
a main vehicle battery;
electronic equipment having volatile memory and high power components;
an ignition branch line coupled to said main vehicle battery and said electrical equipment, including said volatile memory and said high power components;
an ignition switch connected between said main vehicle battery and said ignition branch line;
a power branch line coupled to said volatile memory and coupled to said main vehicle battery, wherein said volatile memory is connected to receive power directly from said main vehicle battery without said power passing through said ignition switch; and
a rechargeable battery coupled to said power branch line to maintain power to said volatile memory in the absence of power from said main vehicle battery and coupled to said ignition branch line for recharging said rechargeable battery in the presence of power from said main vehicle battery.

14. The system of claim 13 further comprising:
a first diode having its cathode connected to said power branch line and having its anode connected to said main vehicle battery.

15. The system of claim 13 wherein said ignition switch has one end connected to said main vehicle battery, and wherein said system further comprises:
a second diode having its cathode connected to said power branch line and having its anode connected to said rechargeable battery; and
a third diode having its anode connected to the other end of said ignition switch and having its cathode connected to said rechargeable battery.

16. The system of claim 13 further comprising an electrical appliance housing and powered by said rechargeable battery.

17. The system of claim 16 wherein said electrical appliance comprises a portable flashlight.

18. The system of claim 16 further comprising a releasable electrical connector for engaging said electrical appliance with said power branch line.

19. The circuit of claim 13 wherein the voltage provided by said rechargeable battery is intermediate the voltage provided by said main vehicle battery and the operating voltage of said volatile memory.

* * * * *